(12) United States Patent
Lackemeyer

(10) Patent No.: US 9,884,584 B1
(45) Date of Patent: Feb. 6, 2018

(54) TELESCOPING BEACON FOR A VEHICLE

(71) Applicant: James R. Lackemeyer, Walkersville, MD (US)

(72) Inventor: James R. Lackemeyer, Walkersville, MD (US)

(*) Notice: Subject to any disclaimer, the term of this patent is extended or adjusted under 35 U.S.C. 154(b) by 243 days.

(21) Appl. No.: 14/813,758

(22) Filed: Jul. 30, 2015

Related U.S. Application Data

(60) Provisional application No. 62/032,151, filed on Aug. 1, 2014.

(51) Int. Cl.
*F21V 19/02* (2006.01)
*F21V 21/14* (2006.01)
*B60Q 1/48* (2006.01)
*B60Q 1/26* (2006.01)

(52) U.S. Cl.
CPC ............ *B60Q 1/482* (2013.01); *B60Q 1/2611* (2013.01); *B60Q 1/2615* (2013.01)

(58) Field of Classification Search
CPC ..... B60Q 1/482; B60Q 1/2615; B60Q 1/2611
USPC .......... 362/523, 540, 549; 340/425.5, 815.45
See application file for complete search history.

(56) References Cited

U.S. PATENT DOCUMENTS

| | | | | |
|---|---|---|---|---|
| RE27,905 E | * | 1/1974 | Whiteman ............... | B66F 9/186 294/81.2 |
| 4,361,864 A | * | 11/1982 | Spiro ...................... | B64D 47/06 362/310 |
| 5,278,556 A | | 1/1994 | Oh | |
| 5,388,546 A | | 2/1995 | Lombard | |
| 5,786,758 A | * | 7/1998 | Bullock ................. | B60Q 1/482 116/202 |
| 5,933,081 A | | 8/1999 | Jones | |
| 6,213,440 B1 | * | 4/2001 | Kornback ............. | B60R 13/005 248/206.5 |
| 6,239,701 B1 | | 5/2001 | Vasquez et al. | |
| 6,246,314 B1 | * | 6/2001 | Djaid ................... | B60Q 1/2611 340/425.5 |
| 6,580,368 B1 | * | 6/2003 | Jacobs ................... | B60Q 1/482 116/209 |
| 7,369,061 B1 | | 5/2008 | Sellers et al. | |
| 2005/0007784 A1 | * | 1/2005 | Stein .................... | B60Q 1/2611 362/307 |
| 2009/0207038 A1 | * | 8/2009 | Gallo ...................... | B60Q 1/52 340/815.45 |
| 2010/0103036 A1 | | 4/2010 | Malone et al. | |
| 2012/0218128 A1 | | 8/2012 | Tieman et al. | |
| 2013/0294073 A1 | * | 11/2013 | Fields ..................... | F21V 17/02 362/235 |
| 2014/0313761 A1 | * | 10/2014 | Nelson-Herron ....... | G09F 17/00 362/523 |

* cited by examiner

*Primary Examiner* — Elmito Breval
*Assistant Examiner* — Glenn Zimmerman
(74) *Attorney, Agent, or Firm* — Robert C. Montgomery; Montgomery Patent & Design, LP

(57) ABSTRACT

An apparatus adapted to provide a locating means for a vehicle lost in a parking facility includes a telescoping device installed on the vehicle and is selectively activated by remote control. When activated, the apparatus will upwardly extend an illuminated beacon to provide a visual indication from a distance.

18 Claims, 4 Drawing Sheets

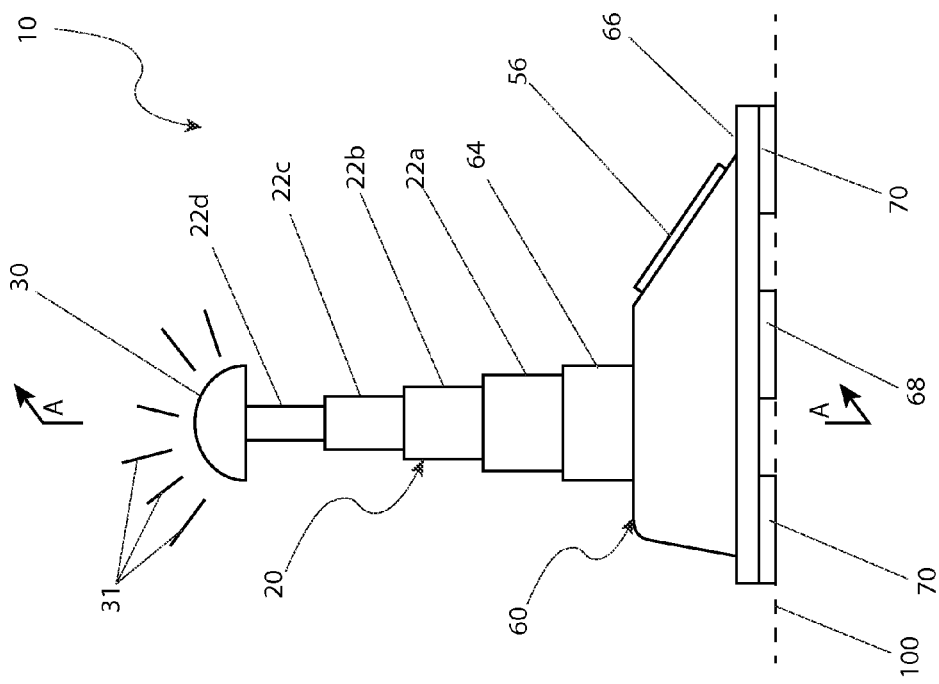
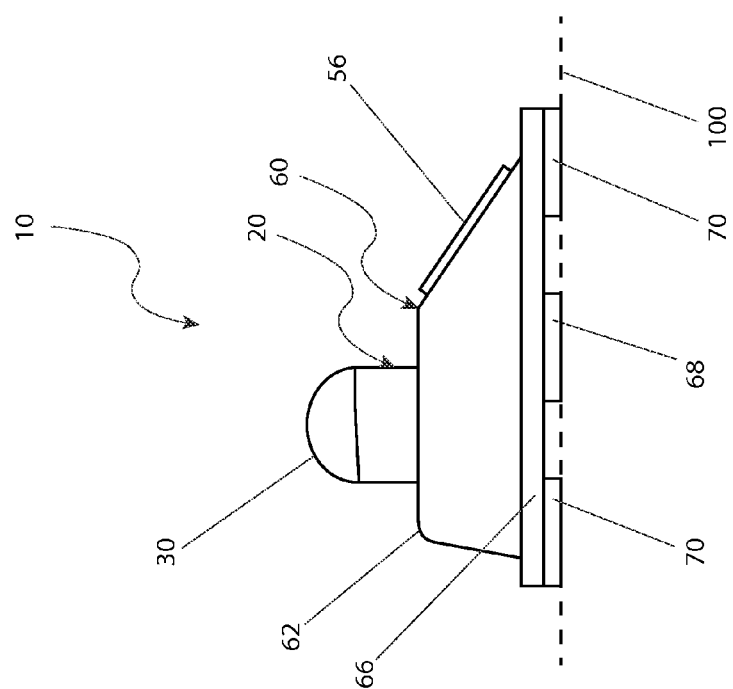

TELESCOPING BEACON FOR A VEHICLE

RELATED APPLICATIONS

The present invention was first described in and claims the benefit of U.S. Provisional Application No. 62/032,151 filed Aug. 1, 2014, the entire disclosures of which are incorporated herein by reference.

FIELD OF THE INVENTION

The present invention relates generally to a telescoping device adapted to provide a locating means for a vehicle. The device is capable of being activated by remote control.

BACKGROUND OF THE INVENTION

Just about everyone has suffered that embarrassing moment when returning to their parked car, and forgetting where he or she parked it. Even setting aside the embarrassment, much valuable time is lost wandering around the parking lot looking for the wayward vehicle. The longer the search continues the greater the anxiety that perhaps the vehicle was towed or stolen. However, setting embarrassment and considerations of time aside, for those individuals who live in intemperate climates, misplacing one's vehicle may subject the person to potentially life threatening exposure.

This is not only a problem in parking lots, but also in parking garages. In fact a parking garage might present an even more challenging task of vehicle location especially in garages where every level is nearly identical. This problem has an upfront solution; however, most people do not take the time to jot down on a scratch of paper where his or her car is parked. But even if the person did, the paper itself is subject to becoming misplaced, usually when needed most. Accordingly, there exists a need for a means by which the location of a parked vehicle can be easily found without the disadvantages as described above. The use of the telescoping beacon provides a handy reminder device to allow for location of a parked vehicle in a manner which is quick, easy, and effective.

SUMMARY OF THE INVENTION

The inventor has recognized the aforementioned inherent problems and lack in the art and observed that there is a need for a locating beacon capable of being activated by remote control.

It is therefore an object of the invention to provide a locating beacon, comprising a housing assembly, adapted to be removably mounted to a vehicle. The beacon further comprises a housing. Within the housing is a mast enclosure and a control means. The housing may have a removable cover. The control means further incorporates a power source and a receiver. A deployment mechanism within the housing is in electrical communication with the power source. A telescoping mast assembly is housed within the mast enclosure and has a bottom end operably attached to the deployment mechanism and deployable therefrom. A dome is affixed to an upper portion of the telescoping mast assembly, having an illumination means for providing illumination and in electrical communication with the power source. The locating beacon comprises a remote control device in wireless communication with the receiver, for remotely controlling the control means to operate the telescoping mast assembly and the illumination means.

The housing assembly further comprises a plurality of pads each affixed to a bottom surface of the housing and a magnet affixed to the bottom surface of the housing. The housing assembly further incorporates a solar energy collecting and generating means for collecting solar energy and generating electricity therefrom. The solar energy collecting and generating means is in electrical communication with the control means.

The housing assembly further incorporates a DC charging jack in electrical communication with the power source. The housing comprises an aerodynamic shape having an inclined forward surface and a widening base portion along the bottom surface.

The deployment mechanism further comprises a drive band attached to a topmost portion of the telescoping mast assembly and disposed within a guide enclosure and a prime mover attached to and operably controlling the drive band opposite the telescoping mast assembly. The prime mover is capable of forward and reversible movement and the drive band conducts electricity between the control means and the illumination means. The telescoping mast assembly further comprises a plurality of interlocking sections.

The locating beacon also comprises a sealing means located between each of the plurality of interlocking sections for sealing internal components from the environment. The dome further comprises a generally hemispherical transparent or translucent body.

The remote control device comprises a vehicle key fob which further comprises a housing with a plurality of buttons containing. Within the housing is a circuit board, a transmitter and a battery. The plurality of buttons, circuit board, transmitter and battery are in electrical communication with each other thereby facilitating radio communication with the receiver. The first button raises the mast assembly and illuminates the illumination means when pressed. The second button lowers the mast assembly and extinguishes the illumination means when pressed. The third button enables a user to independently illuminate and extinguish the illumination means in an alternating manner when pressed.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 2*a* is a side view of the vehicle locating beacon 10 depicting a collapsed state, according to a preferred embodiment of the present invention;

FIG. 2*b* is a side view of the vehicle locating beacon 10 depicting a deployed state, according to a preferred embodiment of the present invention;

DESCRIPTIVE KEY

Figure 1:
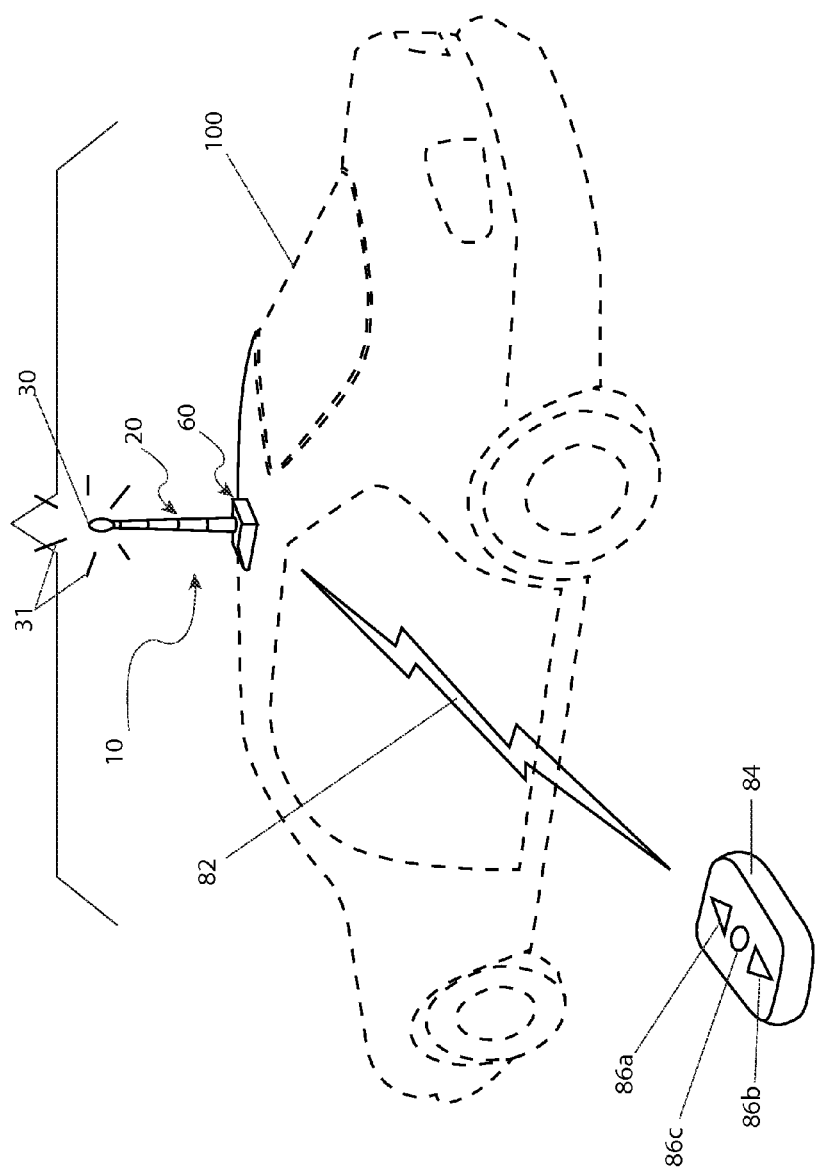
FIG. 1 is an environmental view of a vehicle locating beacon 10, according to a preferred embodiment of the present invention.

10 vehicle locating beacon
20 mast assembly 22a first mast section
22b second mast section
22c third mast section
22d fourth mast section
24 seal
30 dome
31 illumination
32 lamp
40 drive band
42 spool
44 guide enclosure
46 slip ring
50 motor
52 battery
54 control module
55 receiver section
56 solar panel
58 charging jack
60 housing assembly
62 housing
64 mast enclosure
66 base
68 magnet
70 pad
80 wiring
82 signal
84 transmitter
86a first button
86b second button
86c third button
100 vehicle

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a vehicle locating beacon (herein described as the "apparatus") 10, which provides a means to help locate where a parked vehicle 100. The apparatus 10 includes a transmitter 84 and a telescoping mast assembly 20 which deploys upwardly from a housing assembly 60 mounted upon a roof portion of the vehicle 100. The mast assembly 20 includes an illuminating dome portion 30 being visible at a distance.

Referring now to FIG. 1, an environmental view of the apparatus 10, according to the preferred embodiment of the present invention, is disclosed. The apparatus 10 provides a telescoping mast assembly 20 mounted upon a housing assembly 60 which is in turn removably mounted upon the roof portion of the vehicle 100. The mast assembly 20 includes a plurality of interlocking cylindrical sections which deploy upwardly in a telescoping manner from a collapsed height of approximately five inches (5 in.) to a deployed height of approximately sixteen to eighteen inches (16-18 in.).

The transmitter 84, being similar in size, appearance, and function as a vehicle key fob, includes internal electrical and electronic portions such as, but not limited to: a printed circuit board, a transmitter, and a battery. Along one (1) side of the transmitter 84 is a first button 86a, a second button 86b, and a third button 86c. The first button 86a raises the mast assembly 20 and illuminates the lamp 32 when pressed. The second button 86b lowers the mast assembly 20 and extinguishes the lamp 32 when pressed. And the third button 86c enables a user to independently illuminate and extinguish the lamp 32 and dome 30 portions in an alternating manner when desired. Upon pressing a button 86a, 86b, 86c a radio signal 82 is transmitted to a receiver section 55 contained within a control module portion 54 of the housing assembly 60 to motion the mast assembly 20 (see FIGS. 3 and 4).

The mast assembly 20 includes a permanently affixed and generally hemispherical beacon dome 30 upon a top end portion, containing a lamp 32 which illuminates upon deployment of the mast assembly 20. It is envisioned that the lamp 32 be capable of displaying various colors as well as illuminating in a flashing pattern to help a user locate their vehicle 100. Once arriving at the vehicle 100, the user simply presses the second button 86b on the transmitter 84 to lower the mast assembly 20 and deactivate the lamp 32.

The mast assembly 20, housing assembly 60, and dome 30 portions are envisioned to be introduced in various colors and patterns based upon a user's preference or may be colored to match that of a vehicle 100 onto which the apparatus 10 is to be mounted. Furthermore, it is envisioned that the housing assembly 60 may be provided with a "snap-on" cover having a desired color, thereby allowing the apparatus 10 to be easily reconfigured for use upon another vehicle. Finally, the dome 30 is envisioned to be made using a translucent plastic material, and be introduced in various forms so as to personalize the apparatus 10 by displaying various colors, indicia, and logos based upon a user's preference, which correspond to an athletic team, or the like.

Referring now to FIGS. 2a and 2b, side views of the apparatus 10 depicting collapsed and deployed states, according to a preferred embodiment of the present invention, are disclosed. An embodiment of the housing assembly 60 is shown here having a plurality of pads 70 and a magnet 68 adhesively bonded, or otherwise affixed, to a bottom surface portion to securely mount the apparatus 10 to the roof portion of the vehicle 100. The pads 70 are envisioned to be made using a dense foam rubber material and are arranged along a perimeter edge of a base portion 66 of the housing assembly 60. The attraction of the magnet 68 to the roof compresses the pads 70 against the roof of the vehicle 100 providing a lateral friction means. However, it is understood that other means and mechanisms may be utilized such as adhesives, double-face tape, suction cups, and the like, may be utilized to affix the apparatus 10 upon the roof or to other exterior surfaces of the vehicle 100 with equal benefit, and as such should not be interpreted as a limiting factor of the apparatus 10. Preferably, the magnet 68 is disposed on the center of the bottom of the base portion 66.

When in a "ready" collapsed state, the apparatus 10 presents an inconspicuous low-profile form upon the vehicle 100. Furthermore, while in the collapsed state, a solar panel portion 56 integrated into the housing assembly 60 provides an electrical current to charge an internal battery 52 (also see FIGS. 3 and 4).

Figure 3:
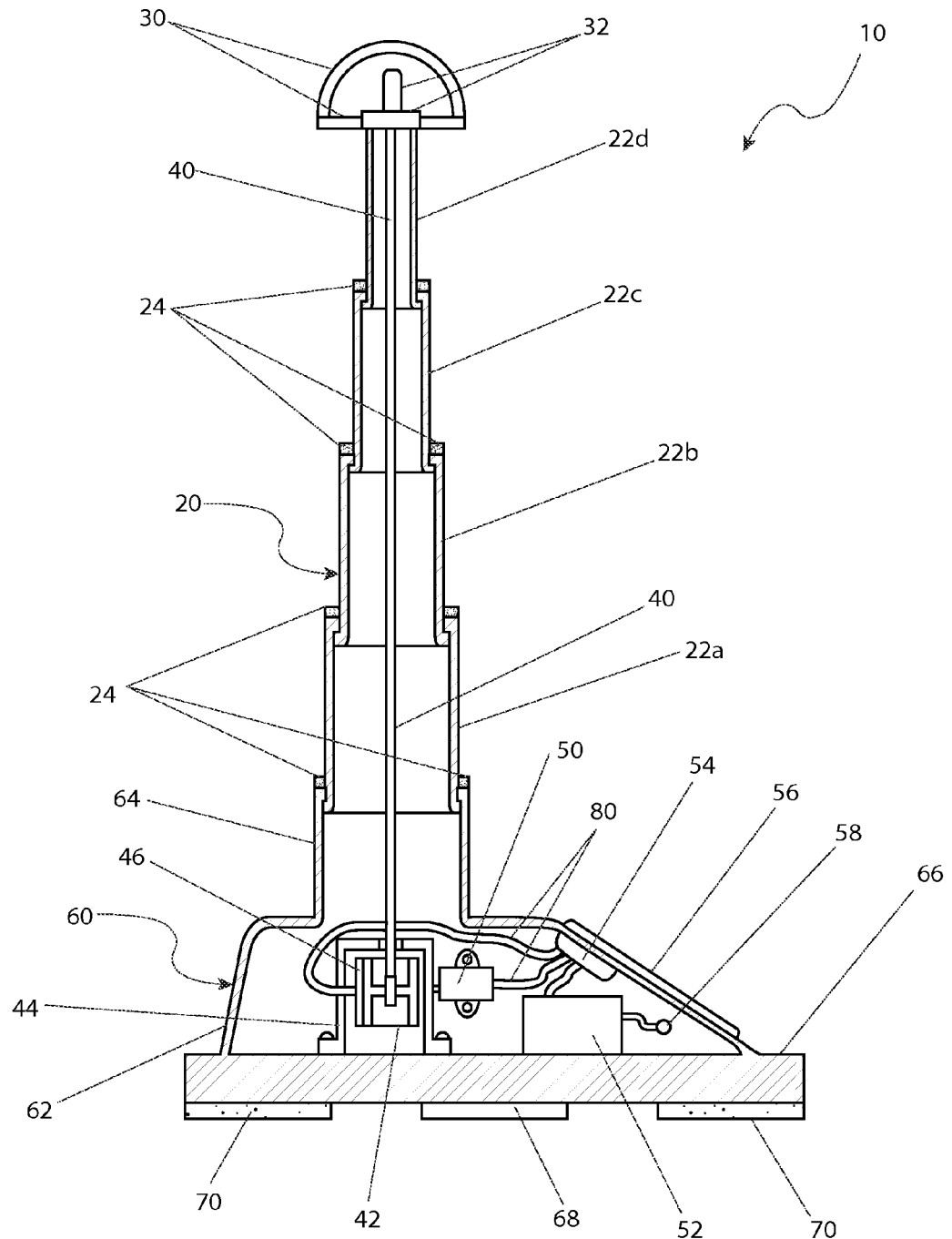
FIG. 3 is a sectional view of the vehicle locating beacon 10 taken along section line A-A (see FIG. 2*b*), according to a preferred embodiment of the present invention; and, FIG. 4 is an electrical block diagram of the vehicle locating beacon 10, according to a preferred embodiment of the present invention.

Referring now to FIG. 3, a sectional view of the apparatus 10 taken along section line A-A (see FIG. 2b), according to a preferred embodiment of the present invention, is disclosed. The housing assembly 60 provides an aerodynamic shape having an inclined forward surface, a widened base portion 66 along a bottom surface for stability, and a mast enclosure 64 along a top surface. The mast enclosure 64 provides a cylindrical shape having an open top portion which insertingly receives the first section portion 22a of the mast assembly 20. The housing assembly 60 also includes electrical and electronic equipment necessary to receive radio signals 82 from the transmitter 84 to motion the mast assembly 20 up and down.

The telescoping sections 22a, 22b, 22c, 22d of the mast assembly 20 provide features to enable interlocking attachment to each other via perpendicularly flanged portions along top and bottom perimeter edges which provide a mechanical limitation to an upward deploying motion of each section 22a, 22b, 22c, 22d while allowing the sections 22a, 22b, 22c, 22d to collapse into each other and compactly into the subjacent mast enclosure portion 64 of the housing assembly 60. Additionally, each section 22a, 22b, 22c, 22d includes a seal 24 along a top edge which bears upon an adjacent inserted section 22a, 22b, 22c, 22d to prevent entry of moisture and/or debris.

The apparatus 10 provides a means to acquire and store an electrical charge to power the motor 50 and the lamp 32. The housing assembly 60 includes internal battery 52 and control module 54 portions, and an external solar panel 56. The solar panel 56 is mounted upon an inclined surface portion of the housing assembly 60, converting solar energy into an electric current which is then conducted to a control module 54. The control module 54 regulates and delivers the current from the solar panel 54 to a rechargeable battery 52 for charging. The battery 52 in turn powers the motor 50 and lamp 32 portions. The housing assembly 60 also provides an alternate method to charge the battery 52 via a charging jack 58 which allows connection to an existing DC power source such as a wall-mounted charger or a cigarette lighter socket during times when the apparatus 10 is removed from the vehicle 100. Software instructions within the control module 54 activate the lamp 32 when the first button 86a is pressed and turns off the lamp 32 when the second button 86b is pressed.

The control module 54 provides a "black-box" unit which contains electrical and electronic equipment necessary for the operation of the apparatus 10 including, but not limited to: a circuit board, microprocessors, relays, embedded software, and a radio receiver section 55. The radio receiver 55 receives the radio signal 82 from the transmitter 84 to activate and motion the mast assembly 20 when a need arises.

The sections 22a, 22b, 22c, 22d are deployed upward via an upwardly protruding drive band 40 which is attached to the fourth section 22d at a top end, and drive mechanism within the housing assembly 60 at a lower end. The drive mechanism includes a spool 42 around which the drive band 40 is wound, a guide enclosure 44 which helps direct the drive band 40 around the spool 42, and a reversible DC motor 50 which turns the spool 42. The drive band 40 is envisioned to be a strip of spring steel or similar resilient material, being similar to a roll-up-type tape measure, a slapstick bracelet, and the like, having a slight lateral camber so as to retain a linear form as it is unwound from the spool 42.

Additionally, the drive band 40 acts as an electrical conductor to provide current to the lamp 32 via a slip ring 46 type connection which is incorporated into the spool 42. Electricity from the control module 54 is delivered through wiring 80 to the slip ring 46 which in turn electrifies the spool 42 and drive band 40 portions. A top end portion of the drive band 40 is in electrical and mechanical communication with the lamp 32.

Figure 4:
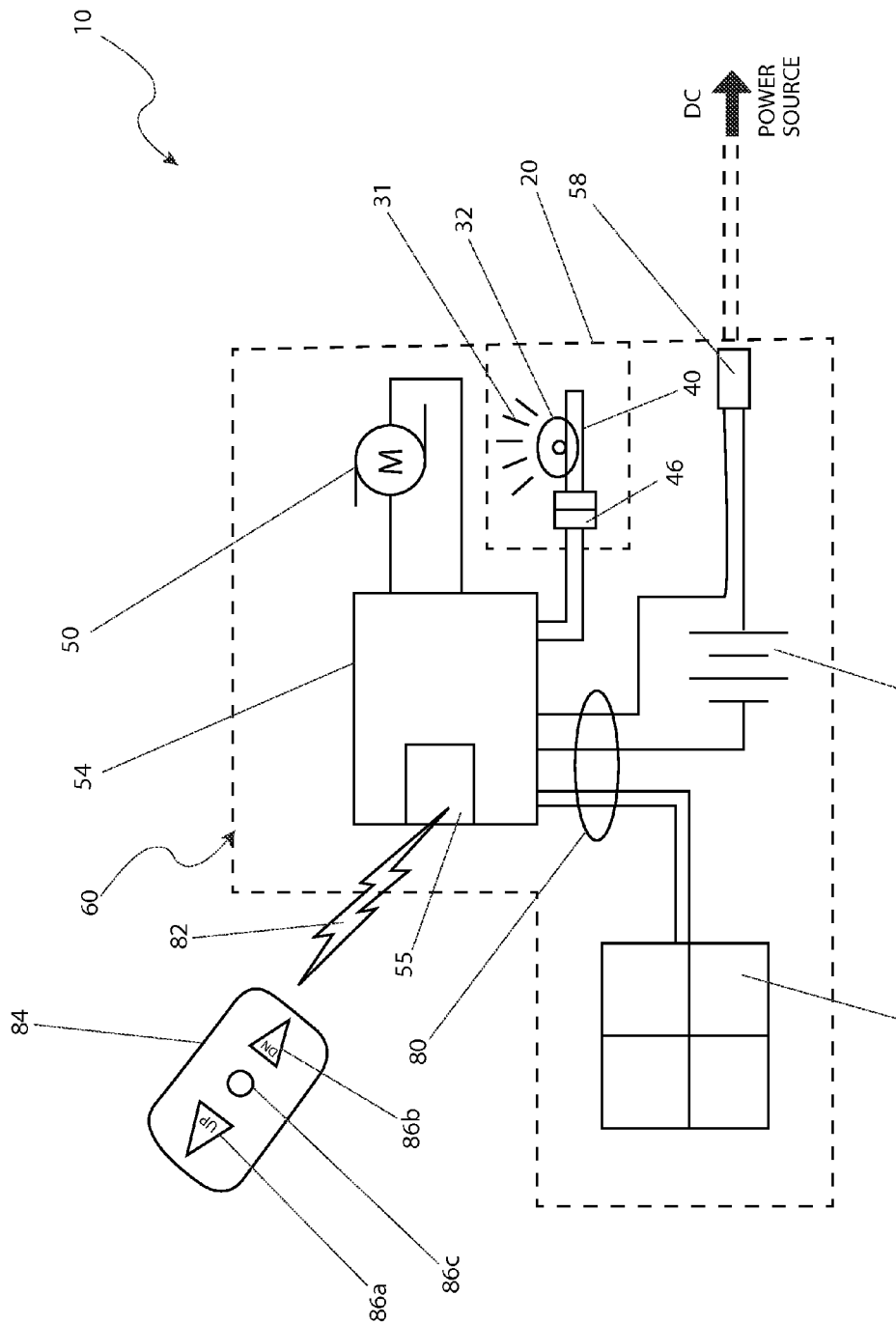

Referring now to FIG. 4, an electrical block diagram of the apparatus 10, according to a preferred embodiment of the present invention, is disclosed. The apparatus 10 includes a standard voltaic-type solar panel 56 which during times of sunlight conducts a current to the control module 54. The control module 54 in turn regulates and delivers a charging current to the rechargeable battery 52. The control module 54 uses the electricity from the battery 52 to power to the motor 50 and lamp 32 portions of the apparatus 10. The apparatus 10 also provides a charging jack 58, being mounted upon the housing assembly 60, which allows connection to an external DC power source to recharge the battery 52.

The control module 54 also includes an integral radio receiver section 55 which receives a user-initiated radio signal 82 from the transmitter 84 to activate the motor 50 and to energize the lamp 32. Electric power is also directed from the control module 54 via wiring 80 to slip ring 46 and drive band 40 portions which deliver electricity to the lamp 32, thereby providing illumination 31 to find the vehicle 100 in both night and daylight situations.

The radio signal 82 is envisioned to be a one-way signal and does not provide for duplex communication or confirmation of a received radio frequency signal 82. It is envisioned that the radio signal 82 would be of a frequency modulated (FM) signal on a frequency authorized for such use; however, other methods of modulation such as amplitude modulation, single side band, digital, continuous wave and the like would work equally well, and as such, should not be interpreted as a limiting factor of the apparatus 10.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1.

The method of installing and utilizing the apparatus 10 may be achieved by performing the following steps: procuring a model of the apparatus 10 having housing assembly 60 and dome 30 portions which provide desired colors and/or logos; charging the battery 52 by connecting the charging jack 58 to a remote DC power source, or by exposing the solar panel 56 to sunlight for a sufficient period of time to charge the battery 52; mounting the apparatus 10 to a roof portion, other desired surface of the vehicle 100 by lowering the base portion 66 of the housing assembly 60 onto the vehicle 100; allowing the attraction of the magnet 68 to the roof to compress the foam rubber pads 70 to provide sufficient friction to hold the apparatus 10 in place; pressing the second button portion 86b of the transmitter 84 to lower the mast assembly 20, if not previously lowered; leaving the apparatus 10 attached to the vehicle 100 in a lowered collapsed state until a need arises to locate a vehicle 100 parked in a shopping mall parking lot, an airport parking lot, or the like; pressing the first button portion 86a of the transmitter 84 to raise the mast assembly 20 and to illuminate 31 the dome 30; scanning for, and observing the illuminated dome portion 30 of the apparatus 10 at a distance; locating and occupying the vehicle 100; pressing the second button portion 86b of the transmitter 84 to lower the mast assembly 20 and turn off the lamp 32; and, benefiting from a means to locate one's vehicle 100 from a significant distance away, afforded a user of the present invention 10.

Additionally, the third button portion 86c of the transmitter 84 may be pressed by a user to independently illuminate and extinguish the lamp 32 and dome 30 portions in an alternating manner if desired.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A locating beacon, comprising:
    a housing assembly, adapted to be removably mounted to a vehicle, further comprising:
        a housing, comprising a mast enclosure;
        a control means housed within said housing, further incorporating a power source and a receiver; and,
        a deployment mechanism housed within said housing and in electrical communication with said power source;
    a telescoping mast assembly housed within said mast enclosure and having a bottom end operably attached to said deployment mechanism and deployable therefrom;
    a dome affixed to an upper portion of said telescoping mast assembly, having an illumination means for providing illumination and in electrical communication with said power source; and,
    a remote control device in wireless communication with said receiver, for remotely controlling said control means to operate said telescoping mast assembly and said illumination means;
    wherein said deployment mechanism further comprises:
        a drive band attached to a topmost portion of said telescoping mast assembly and disposed within a guide enclosure; and
        a prime mover attached to and operably controlling said drive band opposite said telescoping mast assembly;
    wherein said prime mover is capable of forward and reversible movement; and,
    wherein said drive band also conducts electricity between said control means and said illumination means.

2. The locating beacon of claim 1, wherein said housing assembly further comprises:
    a plurality of pads each affixed to a bottom surface of said housing; and,
    a magnet affixed to said bottom surface of said housing.

3. The locating beacon of claim 1, wherein said telescoping mast assembly further comprises a plurality of interlocking sections.

4. The locating beacon of claim 1, wherein said dome further comprises a generally hemispherical transparent or translucent body.

5. The locating beacon of claim 1, wherein said remote control device comprises a vehicle key fob further comprising:
    a housing with a plurality of buttons;
    a circuit board within said housing;
    a transmitter within said housing; and,
    a battery within said housing;
    wherein said plurality of buttons, circuit board, transmitter and battery are in electrical communication with each other, thereby facilitating radio communication with said receiver;
    wherein said first button raises the mast assembly and illuminates the illumination means when pressed;
    wherein said second button lowers the mast assembly and extinguishes the illumination means when pressed; and,
    wherein said third button enables a user to independently illuminate and extinguish the illumination means in an alternating manner when pressed.

6. The locating beacon of claim 2, wherein said housing assembly further incorporates a solar energy collecting and generating means for collecting solar energy and generating electricity therefrom, said solar energy collecting and generating means in electrical communication with said control means.

7. The locating beacon of claim 2, wherein said housing assembly further incorporates a DC charging jack in electrical communication with said power source.

8. The locating beacon of claim 2, wherein said housing comprises an aerodynamic shape having an inclined forward surface and a widening base portion along said bottom surface.

9. The locating beacon of claim 3, further comprising a sealing means located between each of said plurality of interlocking sections for sealing internal components from the environment.

10. A locating beacon, comprising:
    a housing assembly, adapted to be removably mounted to a vehicle, further comprising:
        a housing, having a removable cover and further comprising a mast enclosure;
        a control means housed within said housing, further incorporating a power source and a receiver; and,
        a deployment mechanism housed within said housing and in electrical communication with said power source;
    a telescoping mast assembly housed within said mast enclosure and having a bottom end operably attached to said deployment mechanism and deployable therefrom;
    a dome affixed to an upper portion of said telescoping mast assembly, having an illumination means for providing illumination and in electrical communication with said power source; and,
    said receiver in wireless communication with a remote control device in wireless communication with said receiver, for remotely controlling said control means to operate said telescoping mast assembly and said illumination means;
    wherein said deployment mechanism further comprises:
        a drive band attached to a topmost portion of said telescoping mast assembly and disposed within a guide enclosure; and
        a prime mover attached to and operably controlling said drive band opposite said telescoping mast assembly;
    wherein said prime mover is capable of forward and reversible movement; and,
    wherein said drive band also conducts electricity between said control means and said illumination means.

11. The locating beacon of claim 10, wherein said housing assembly further comprises:

a plurality of pads each affixed to a bottom surface of said housing; and, a magnet affixed to said bottom surface of said housing.

12. The locating beacon of claim 10, wherein said telescoping mast assembly further comprises a plurality of interlocking sections.

13. The locating beacon of claim 10, wherein said dome further comprises a generally hemispherical transparent or translucent body.

14. The locating beacon of claim 10, wherein said remote control device comprises a vehicle key fob further comprising:
- a housing with a plurality of buttons;
- a circuit board within said housing;
- a transmitter within said housing; and,
- a battery within said housing;
- wherein said plurality of buttons, circuit board, transmitter and battery are in electrical communication with each other, thereby facilitating radio communication with said receiver;
- wherein said first button raises the mast assembly and illuminates the illumination means when pressed;
- wherein said second button lowers the mast assembly and extinguishes the illumination means when pressed; and,
- wherein said third button enables a user to independently illuminate and extinguish the illumination means in an alternating manner when pressed.

15. The locating beacon of claim 11, wherein said housing assembly further incorporates a solar energy collecting and generating means for collecting solar energy and generating electricity therefrom, said solar energy collecting and generating means in electrical communication with said control means.

16. The locating beacon of claim 11, wherein said housing assembly further incorporates a DC charging jack in electrical communication with said power source.

17. The locating beacon of claim 11, wherein said housing comprises an aerodynamic shape having an inclined forward surface and a widening base portion along said bottom surface.

18. The locating beacon of claim 12, further comprising a sealing means located between each of said plurality of interlocking sections for sealing internal components from the environment.

\* \* \* \* \*